United States Patent Office 3,159,409
Patented Dec. 1, 1964

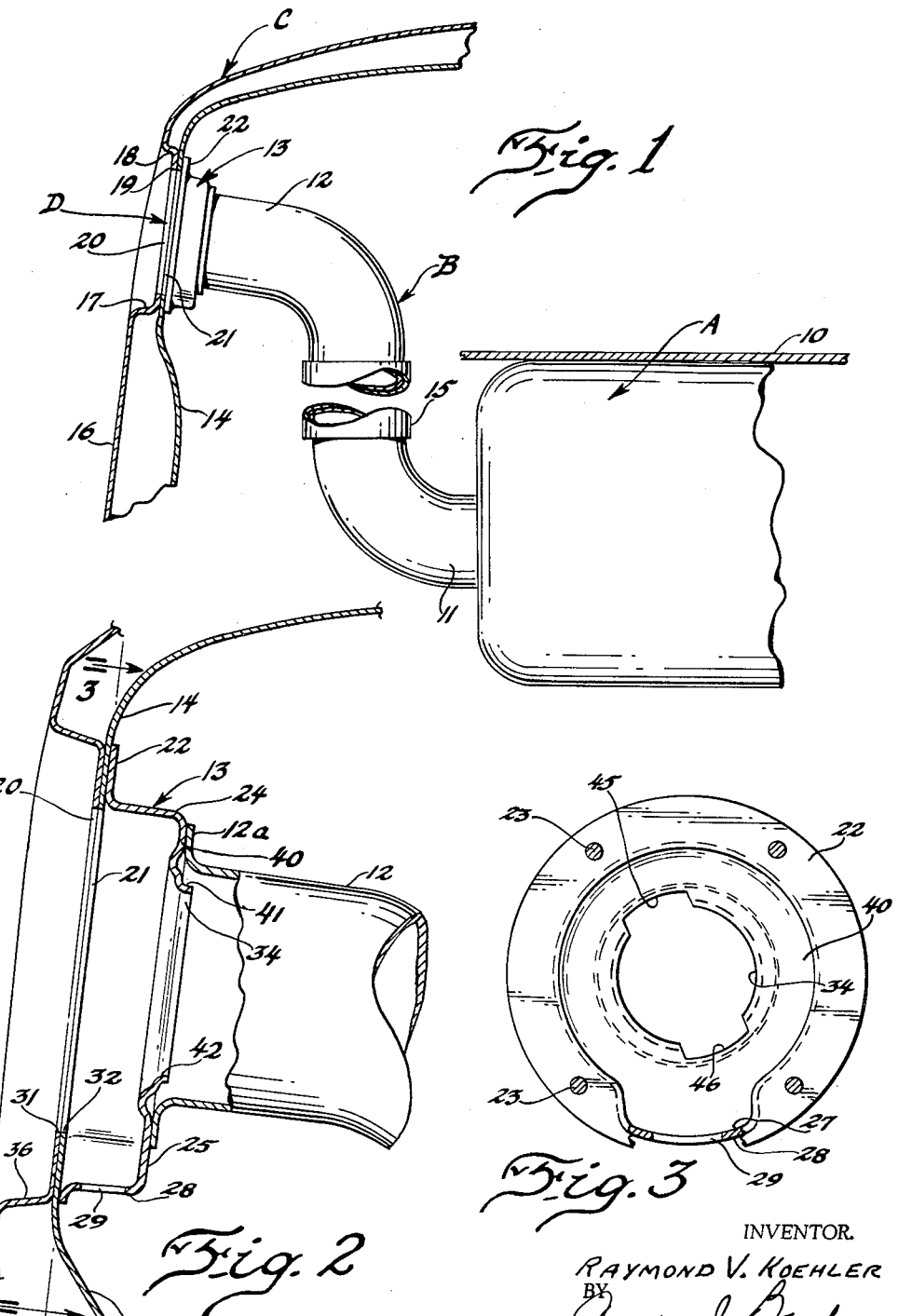

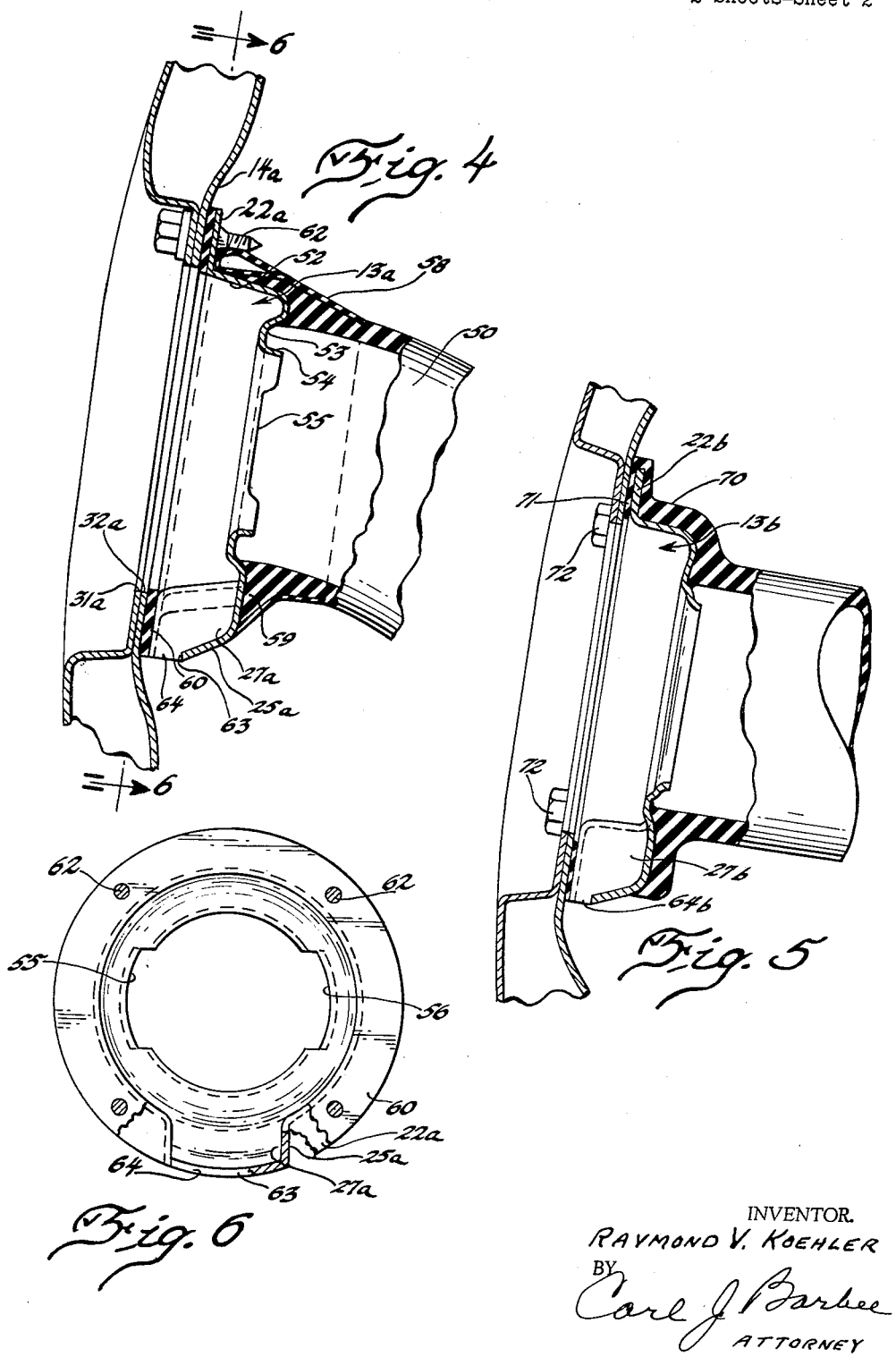

3,159,409
FUEL TANK FILLER TUBE AND DRAIN
Raymond V. Koehler, Kenosha, Wis., assignor to American Motors Corporation, Kenosha, Wis., a corporation of Maryland
Filed Nov. 14, 1962, Ser. No. 237,485
6 Claims. (Cl. 280—5)

The invention relates to a fuel tank filler tube and drain.

In the construction of an automobile, the fuel storage tank is usually secured to the vehicle body beneath the floor thereof in a location which requires an inlet or filler tube leading therefrom to the exterior surface of the vehicle. The fuel supply in the storage tank is replenished from the exterior of the vehicle by inserting the nozzle portion of a supply hose into the entrance portion of the filler tube. Frequently, the fuel tank and filler tube will be over supplied by a filling station attendant and excess fuel drains across the exterior body surface of the vehicle.

The principal object of the invention is to provide means for draining excess fuel on the inside wall of the vehicle body to prevent spillage on the exterior surface thereof.

A specific object is to provide a filler tube having at its entrance end a fitting in the nature of a cap structure for attachment to the interior wall of the vehicle body, said cap structure having a drainage pocket formed therein.

Another object is to provide such a cap structure which incorporates a bearing surface for the fuel supply nozzle and means for anchoring a closure cover or cap.

Other objects and advantages of the invention will be apparent from the ensuing specification and appended drawings in which:

FIGURE 1 is a fragmentary sectional view showing a portion of a vehicle wheel housing or fender and associated fuel storage tank together with the inventive subject matter.

FIGURE 2 is an enlarged fragmentary sectional view of a portion of the apparatus shown in FIGURE 1.

FIGURE 3 is a fragmentary sectional view taken on the line 3—3 of FIGURE 2.

FIGURE 4 is a fragmentary sectional view similar to FIGURE 2 and showing a modified form of the invention.

FIGURE 5 is a fragmentary sectional view similar to FIGURE 2 showing another modified form of the invention.

FIGURE 6 is a fragmentary sectional view taken on the line 6—6 of FIGURE 4.

Referring to FIGURES 1, 2 and 3, I have shown one form of the invention in which the fuel storage tank A is provided with a fuel feeding or filler tube B having its entrance portion anchored to the vehicle wheel housing C. The wheel housing has an entrance opening D through which the nozzle of a fuel supply hose (not shown) is inserted for replenishing the fuel supply in the storage tank.

In FIGURE 1, I have shown the wheel housing opening in section at the axial center line thereof; however, the filler tube is shown in elevation. It will be understood that the axial center line of the entrance portion of the filler tube would be coaxial with the axial center line of the wheel housing opening.

The fuel storage tank A is situated so as to be secured to some portion of the vehicle body, such as the floor, identified generally by the numeral 10. The filler tube B has one end 11 opening into the interior of the fuel storage tank and its other end 12 with its mounting flange 12a anchored to the mounting cap 13 as by welding. The mounting cap in turn is anchored to the interior wall panel 14 of the wheel housing. In FIGURES 1 and 2 the filler tube is shown as being of a construction in which the end portions are of generally rigid construction and an intermediate sleeve portion 15 may be formed of elastic material to facilitate assembly.

In a typical wheel housing arrangement, one stamping would form the outer panel 16 and a separate stamping 14 would form the inner panel. The exterior surface of the outer panel is, of course, exposed to view and is painted for esthetic as well as rust proofing purposes. The outer panel may be formed with the recessed area 17 providing a generally annular pocket 18 within the confines of which a closure cover or cap (not shown) would be inserted. This cap, of course, is temporarily removed preparatory to inserting the nozzle of a fuel supply hose into the entrance end of the filler tube. A radially inwardly turned flange 19 circumscribes the opening 20 in the outer housing panel. The inner panel has an opening 21 in registry with opening 20.

The cap structure 13 includes a radially outwardly directed flange 22 which is anchored against the inner housing panel in a suitable manner, as by means of sheet metal screws 23 (see FIGURE 3). The cup-shaped central portion 24 of the cap surrounds the panel openings and includes a downwardly projecting boss 25. The boss provides a pocket area 27, the floor 28 of which is provided with a drain opening 29. It will be noted that the floor portion 28 of the drain pocket is situated beneath the level of the lowermost points 31 and 32 of the wall panel openings. Thus, when a fuel supply hose nozzle is inserted through the opening 34 in the cap 13 and an excessive amount of fuel is added into the fuel tank, any spillage will drop into the pocket 27 and thence through the opening 29 onto the interior surface 35 of the interior wall panel instead of flowing into the area 36 of the outer wall panel and thence onto the exterior surface of the wheel housing.

The cap structure 13 has a radially inwardly extending wall 40 terminating with an axially directed flange portion 41, the lowermost area 42 of which serves as a bearing support for the fuel supply nozzle to rest on during the filling of the fuel tank. The flange portion 41 may be provided with notches 45 and 46 (see FIGURE 3) which function in connection with anchoring the outer closure cap (not shown).

In the modified form of the invention as shown in FIGURES 4 and 6, an elastic type of tubing 50 may be employed for extending between the fuel storage tank and the wheel housing opening. The cap structure 13a is provided with a radially outwardly extending flange 22a, an axially directed cup portion 52 and a radially inwardly directed central wall portion 53. The annular flange portion 54 may be provided with notches 55 and 56, serving the same function as the notches 45 and 46 of FIGURE 3.

The upper end of the elastic filler tube may encircle the cup wall 52 and be bonded thereto. An additional outer sleeve 58 may be adhered to and encircle the end portion 59 for assisting in anchoring the tubing to the cap structure. A gasket 60 is interposed between the flange 22a and the mounting flange portion of the interior panel 14a. Sheet metal type screws 62 may be used for anchoring the end of the filler tube to the wheel housing panels. The cap structure 13a is provided with a downwardly projecting boss 25a, the floor of which terminates at 63 providing the drain opening 64.

The drain opening in the pocket 27a is, of course, situated beneath the level of the lowermost points 31a and 32a of the housing panel openings thereby assuring that any spillage of fuel will run into the pocket 27a and through drain opening 64 instead of running out over the exterior surface of the wheel housing.

In the form of the invention as shown in FIGURE 5, the filler tube may be of elastic material and has a generally bell-shaped end portion 70 bonded to the outer surface of the cap structure 13b and the end portion overhangs the flange 22b to form a gasket 71 which is interposed between the cap flange and the interior panel of the wheel housing. Suitable fastening screws 72 may be used for anchoring the end of the filler tube with reference to the wheel housing panels. A downwardly projecting boss provides the pocket 27b with the drain opening 64b serving a function similar to drain opening 64.

I claim:

1. A fuel filler apparatus for an automotive vehicle comprising: a vehicle body wall inclined from a horizontal plane and having interior and exterior sides and having an opening therein defining about its perimeter a mounting flange; a fuel storage tank and a filler tube extending from the body wall opening to the storage tank; a generally rigid mounting cap anchored at the end of the filler tube adjacent the wall opening, said cap having a central portion with an opening therein through which a fuel supply nozzle can be inserted; said cap having a flange projecting radially outwardly from the central portion and being secured to the mounting flange of the vehicle body wall; said cap having a pocket formed at its lower end below the lowermost level of the body wall opening and a drain opening establishing communication between the pocket and the vehicle body wall on the interior side, whereby any fuel spillage from the nozzle will drain into the cap pocket and through the drain opening on the interior side of the vehicle body wall.

2. A fuel filler apparatus for an automotive vehicle comprising: a vehicle body wall inclined from a horizontal plane and having interior and exterior sides and having an opening therein defining about its perimeter a mounting flange; a fuel storage tank and a filler tube extending from the vehicle body wall opening to the storage tank; a generally rigid mounting cap in the form of a stamping anchored at the end of the filler tube adjacent the vehicle body wall opening, said cap having a central portion with an opening therein through which a fuel supply nozzle can be inserted; said cap having a flange projecting radially outwardly from the central portion and being secured to the mounting flange of the vehicle body wall; a gasket interposed between the cap flange and the vehicle body wall mounting flange; said cap having a pocket formed at its lower end below the lowermost level of the body wall opening and a drain opening establishing communication between the pocket and the vehicle body wall on the interior side, whereby any fuel spillage from the nozzle will drain into the cap pocket and through the drain opening on the interior side of the vehicle body wall.

3. A fuel filler apparatus for an automotive vehicle comprising: a vehicle body wall inclined from a horizontal plane and having interior and exterior sides and having an opening therein defining about its perimeter a mounting flange; a fuel storage tank and a filler tube extending from the body wall opening to the storage tank; a generally rigid cup-shaped mounting cap anchored at the end of the filler tube adjacent the wall opening; said cap having a central portion with an opening therein through which a fuel supply nozzle can be inserted; said cap having an intermediate wall portion emanating from the central portion and providing a mounting surface to receive the end of the filler tube; said cap having a flange projecting radially outwardly from the intermediate wall portion and being secured to the mounting flange of the vehicle body wall; said cap having a pocket formed at its lower end below the lowermost level of the body wall opening and a drain opening establishing communication between the pocket and the vehicle body wall on the interior side, whereby any fuel spillage from the nozzle will drain into the cap pocket and through the drain opening on the interior side of the vehicle body wall.

4. A fuel filler apparatus for an automotive vehicle comprising: a vehicle body wall inclined from a horizontal plane and having interior and exterior sides and having an opening therein defining about its perimeter a mounting flange; a fuel storage tank and a flexible filler tube extending from the body wall opening to the storage tank; a generally rigid cup-shaped mounting cap anchored at the end of the filler tube adjacent the wall opening; said cap having a central portion with an opening therein through which a fuel supply nozzle can be inserted; said cap having an intermediate wall portion emanating from the central portion and providing a mounting surface for telescopically receiving the end of the filler tube which is bonded thereto by vulcanizing; said cap having a flange projecting radially outwardly from the intermediate wall portion and being secured to the mounting flange of the vehicle body wall; said cap having a pocket formed at its lower end below the lowermost level of the body wall opening and a drain opening establishing communication between the pocket and the vehicle body wall on the interior side, whereby any fuel spillage from the nozzle will drain into the cap pocket and through the drain opening on the interior side of the vehicle body wall.

5. A fuel filler apparatus for an automotive vehicle comprising: a vehicle body wall inclined from a horizontal plane and having interior and exterior sides and having an opening therein defining about its perimeter a mounting flange; a fuel storage tank and a flexible filler tube extending from the body wall opening to the storage tank; a generally rigid mounting cap anchored at the end of the filler tube adjacent the wall opening; said cap having a central portion with an opening therein through which a fuel supply nozzle can be inserted; said cap having a flange projecting radially outwardly from the central portion and being secured to the mounting flange of the vehicle body wall; said cap having a pocket formed at its lower end below the lowermost level of the body wall opening and the lower wall of the pocket terminating short of the plane of the cap flange thereby providing a drain opening establishing communication between the pocket and the vehicle body wall on the interior side, whereby any fuel spillage from the nozzle will drain into the cap pocket and through the drain opening on the interior side of the vehicle body wall.

6. A fuel filler apparatus as set forth in claim 5 wherein the end of the filler tube overhangs the cap flange to provide a gasket for interposition between the cap flange and the vehicle body wall mounting flange.

References Cited in the file of this patent

UNITED STATES PATENTS

| | | |
|---|---|---|
| 2,138,104 | Kellogg | Nov. 29, 1938 |
| 2,314,710 | Keller | Mar. 23, 1943 |
| 3,016,161 | Peplin | Jan. 9, 1962 |